United States Patent [19]

Lengerich et al.

[11] Patent Number: 4,999,208
[45] Date of Patent: Mar. 12, 1991

[54] EXTRUSION BAKING OF COOKIES HAVING LIPOSOME ENCAPSULATED INGREDIENTS

[75] Inventors: Bernhard V. Lengerich, Ringwood; Lynn C. Haynes; Harry Levine, both of Morris Plains; Michael S. Otterburn, Randolph; Paul Mathewson; John Finley, both of Whippany, all of N.J.

[73] Assignee: Nabisco Brands, Inc., East Hanover, N.J.

[21] Appl. No.: 362,741

[22] Filed: Jun. 7, 1989

[51] Int. Cl.$^5$ .................. A21D 8/00; A21D 13/00
[52] U.S. Cl. ........................... 426/549; 426/89; 426/94; 426/243
[58] Field of Search ............... 426/94, 549, 89, 243

[56] References Cited

U.S. PATENT DOCUMENTS

| | | |
|---|---|---|
| 1,625,022 | 4/1927 | Fousek . |
| 2,120,138 | 6/1938 | Mathews et al. ............... 99/81 |
| 2,183,693 | 12/1939 | Rasch ............................. 107/14 |
| 2,488,046 | 11/1949 | Werner et al. ................. 107/29 |
| 2,582,542 | 1/1952 | Hein ............................... 107/29 |
| 2,838,012 | 6/1958 | Weidenmiller et al. ........ 107/29 |
| 2,838,013 | 6/1958 | Weidenmiller et al. ........ 107/29 |
| 3,021,220 | 2/1962 | Going et al. ................... 99/92 |
| 3,064,589 | 11/1962 | Genich ........................... 107/29 |
| 3,158,486 | 11/1964 | Mork et al. ..................... 99/86 |
| 3,195,868 | 7/1965 | Loomans et al. .............. 259/104 |
| 3,215,094 | 11/1965 | Oldershaw et al. ............ 107/54 |
| 3,275,449 | 9/1966 | Fritzberg ....................... 99/80 |
| 3,393,074 | 7/1968 | Ehrlich .......................... 99/92 |
| 3,424,590 | 1/1969 | Booras ........................... 99/90 |
| 3,458,321 | 7/1969 | Reinhart ........................ 99/80 |
| 3,462,276 | 8/1969 | Benson .......................... 99/81 |
| 3,480,445 | 11/1969 | Slaybaugh ..................... 99/83 |
| 3,482,992 | 12/1969 | Benson .......................... 99/81 |
| 3,490,750 | 1/1970 | Brennan ........................ 259/104 |
| 3,492,127 | 1/1970 | Ketch et al. ................... 99/86 |
| 3,615,675 | 10/1971 | Wisdom ......................... 99/83 |
| 3,682,652 | 8/1972 | Corbin et al. .................. 99/83 |
| 3,692,535 | 9/1972 | Norsby .......................... 99/92 |
| 3,732,109 | 5/1973 | Poat et al. ..................... 99/83 |
| 3,753,729 | 8/1973 | Harms et al. .................. 99/82 |
| 3,767,421 | 10/1973 | Gulstad et al. ................. 426/153 |
| 3,767,422 | 10/1973 | Levitz ............................. 426/152 |
| 3,769,034 | 10/1973 | Dreier, Jr. et al. ............. 426/151 |
| 3,861,287 | 1/1975 | Manser .......................... 99/348 |
| 3,908,025 | 9/1975 | Miller et al. .................... 426/623 |
| 3,922,369 | 11/1975 | Glicksman et al. ............ 426/548 |
| 3,987,207 | 10/1976 | Spaeti et al. ................... 426/99 |
| 4,020,187 | 4/1977 | McCulloch et al. ............ 426/72 |
| 4,038,481 | 7/1977 | Antrim et al. ................. 536/56 |
| 4,039,168 | 8/1977 | Caris et al. ..................... 259/9 |
| 4,044,159 | 8/1977 | Lutz ................................ 426/302 |
| 4,044,661 | 8/1977 | Balaz ............................. 99/355 |
| 4,099,455 | 7/1978 | Wenger et al. ................ 99/450.1 |
| 4,104,463 | 8/1978 | Antrim et al. ................. 536/56 |
| 4,126,710 | 11/1978 | Jaworshi et al. .............. 426/589 |
| 4,128,051 | 12/1978 | Hildebolt ....................... 99/348 |

(List continued on next page.)

FOREIGN PATENT DOCUMENTS

| | | |
|---|---|---|
| 1247926 | 1/1989 | Canada ................................. 99/113 |
| 0052046 | 5/1982 | European Pat. Off. . |
| 0098642 | 1/1984 | European Pat. Off. . |
| 102232 | 3/1984 | European Pat. Off. . |
| 0134322 | 3/1985 | European Pat. Off. . |
| 0145550 | 6/1985 | European Pat. Off. . |
| 0213007 | 3/1987 | European Pat. Off. . |
| 0251375 | 1/1988 | European Pat. Off. . |
| 0252270 | 1/1988 | European Pat. Off. . |
| 0275878 | 7/1988 | European Pat. Off. . |
| 0296039 | 12/1988 | European Pat. Off. . |
| 3238791 | 4/1984 | Fed. Rep. of Germany . |
| 2602398 | 2/1988 | France . |
| 0173040 | of 1984 | Japan . |
| 0241841 | 11/1985 | Japan . |
| 291249 | 8/1985 | Netherlands . |
| 8606938 | 12/1986 | PCT Int'l Appl. . |
| 0558141 | 12/1943 | United Kingdom . |
| 1175595 | 12/1969 | United Kingdom . |
| 1254562 | 11/1971 | United Kingdom . |
| 1471108 | 4/1977 | United Kingdom . |
| 1561190 | 2/1980 | United Kingdom . |
| 2131670A | 6/1984 | United Kingdom . |
| 2132868 | 7/1984 | United Kingdom . |
| 2136666A | 9/1984 | United Kingdom . |

OTHER PUBLICATIONS

Anderson et al., "Gelatinization of Corn Grits by Roll Cooking Extrusion Cooking and Steaming", *Die Strake*, 22, Jahrg. NR.4, pp. 130–134.

(List continued on next page.)

Primary Examiner—Marianne Cintins
Assistant Examiner—Mary S. Mims

[57] ABSTRACT

A cookie product is prepared having a liposome-encapsulated component dispersed therein and leavened to a crumb-like structure. The liposomes substantially retain their structural integrity during the processing, mixing, and post extrusion baking and thus remain intact in the finished cookie. The liposomes may encapsulate flavorings, fragrances, preservatives, anti-staling agents, and other labile food additives. The liposomes may provide a sustained release of the encapsulant to the cookie during storage and prior to consumption. The encapsulant may be released when the cookie is baked or eaten by the consumer. The cookies are prepared by feeding the cookie ingredients to a blending zone of a cooker-extruder and heated to form a heat treated mass. A liposome-encapsulated component is added to the cooled heat treated mass and mixed at low pressure and temperature to prevent rupture of the liposomes. An optional source of water may also be admixed to form a dough-like mixture. The dough-like mixture is then extruded into shaped cookie pieces, and leavened by heating in an oven. The heat treating of the dough-like mixture in the cooker-extruder reduces the post extrusion baking time such that liposomes prepared from phospholipids having a high phase transition temperature substantially retain their structure integrity in the leavened cookie.

27 Claims, No Drawings

U.S. PATENT DOCUMENTS

| | | | |
|---|---|---|---|
| 4,190,410 | 2/1980 | Rhodes | 425/239 |
| 4,217,083 | 8/1980 | Machoque | 425/198 |
| 4,217,344 | 8/1980 | Vanlerberghe et al. | 514/474 |
| 4,218,480 | 8/1980 | Dyson et al. | 426/19 |
| 4,219,580 | 8/1980 | Torres | 426/549 |
| 4,225,630 | 9/1980 | Pitchon | 426/623 |
| 4,239,906 | 12/1980 | Antrim et al. | 536/56 |
| 4,245,552 | 1/1981 | Small et al. | 99/483 |
| 4,251,551 | 2/1981 | VanHulle | 426/94 |
| 4,277,464 | 7/1981 | Ressner et al. | 424/177 |
| 4,285,271 | 8/1981 | Falck et al. | 99/348 |
| 4,318,931 | 3/1982 | Schiffman et al. | 426/243 |
| 4,322,202 | 3/1982 | Martinez | 425/208 |
| 4,344,975 | 8/1982 | Seiler | 426/285 |
| 4,350,713 | 9/1982 | Dyson et al. | 426/243 |
| 4,379,171 | 4/1983 | Furda et al. | 426/291 |
| 4,394,395 | 7/1983 | Rostagno et al. | 426/285 |
| 4,418,088 | 11/1983 | Cantenot | 426/549 |
| 4,431,674 | 2/1984 | Fulger et al. | 426/18 |
| 4,438,146 | 3/1984 | Colby et al. | 426/448 |
| 4,454,804 | 6/1984 | McCulloch | 99/348 |
| 4,455,333 | 6/1984 | Hong et al. | 426/94 |
| 4,465,447 | 8/1984 | Cheigh et al. | 425/72 |
| 4,465,452 | 8/1984 | Masuzawa | 425/308 |
| 4,478,857 | 10/1984 | Stauss | 426/72 |
| 4,492,250 | 1/1985 | Levine | 425/142 |
| 4,497,850 | 2/1985 | Gould et al. | 426/560 |
| 4,500,558 | 2/1985 | Fulger et al. | 426/463 |
| 4,503,080 | 3/1985 | Brabbs et al. | 426/94 |
| 4,563,358 | 1/1986 | Mercer et al. | 426/89 |
| 4,568,550 | 2/1986 | Fulger et al. | 426/19 |
| 4,568,551 | 2/1986 | Seewi et al. | 426/99 |
| 4,608,261 | 8/1986 | MacKenzie | 426/242 |
| 4,618,499 | 10/1986 | Wainwright | 426/283 |
| 4,650,685 | 3/1987 | Persson et al. | 426/285 |
| 4,661,360 | 4/1987 | Smith | 426/94 |
| 4,664,921 | 5/1987 | Seiden | 426/94 |
| 4,668,519 | 5/1987 | Dartey et al. | 426/548 |
| 4,685,878 | 8/1987 | Pinto | 425/202 |
| 4,693,899 | 9/1987 | Hong et al. | 426/94 |
| 4,741,264 | 5/1988 | McPeak | 99/483 |
| 4,752,484 | 6/1988 | Pflaumer et al. | 426/94 |
| 4,756,921 | 7/1988 | Calandro et al. | 426/560 |
| 4,762,723 | 8/1988 | Strong | 426/283 |
| 4,764,388 | 8/1988 | Sullivan et al. | 426/311 |
| 4,770,890 | 9/1988 | Giddey et al. | 426/549 |
| 4,771,915 | 9/1988 | Cand et al. | 222/56 |
| 4,777,057 | 10/1988 | Sugisawa et al. | 426/412 |
| 4,778,690 | 10/1988 | Sadel, Jr. et al. | 426/560 |
| 4,786,514 | 11/1988 | Wiedmann | 426/231 |
| 4,828,853 | 5/1989 | Banks et al. | 426/94 |
| 4,844,937 | 7/1989 | Wilkinson et al. | 426/559 |
| 4,844,938 | 7/1989 | Amamoto et al. | 426/589 |
| 4,851,247 | 7/1989 | Greenhouse et al. | 426/250 |
| 4,911,939 | 3/1990 | Lou et al. | 426/241 |

OTHER PUBLICATIONS

Anderson et al., "The Terminology and Methodology Associated with Basic Starch Phenomena", *Cereal Foods World*, vol. 33, No. 3, p. 306 (Mar. 1988).

Atwell et al., "The Terminology and Methodology Associated with Basic Starch Phenomena", *Cereal Foods World*, vol. 33, No. 3, p. 306 (Mar. 1988).

Continuous Twin—Screw Processing-Future Oriented Technology, Werner & Pfleiderer Corporation, 663 East Cresent Ave., Ransey, N.J. (Undated).

*Koch–Und Extrudier-Techniken,* "Biscuits", Internationales Susswaren-Institut (1982).

Leung et al., "Storage Stability of a Puff Pastry Dough With Reduced Water Activity", *J. Food Science,* vol. 49, No. 6, p. 1405, (Nov. Dec., 1984).

Lorenz et al., "Baking with Microwave Energy", *Food Technology,* pp. 28–36 (Dec. 1973).

Mercier et al., *Extrusion Cooking,* pp. 347–353 and 404–415 (1989).

Nestl, Birgit, Doctoral Thesis, Entitled, "Formula and Process Optimization for the Extrusion of Baked Goods Under Particular Consideration of Various Lipids and Sweetners (Dietetic Products and Products with Different Nutritional Value)", Justus–Liebig, University of Giessen, Giessen, W. Germany (Filed Mar. 1989).

Processing: Extruded Snacks, Wernera and Pfleiderer, GmbH, Postaach 30, 1220 Theodorstrasse 10 7000 Stuttgart 30, West Germany (undated).

Rossen et al., "Food Extrusion", *Food Technology,* pp. 46–53 (Aug. 1973).

Sanderude, K., "Continous Cooking Extrusion: Benefits to the Snack Food Industry", *Cereal Science Today,* vol. 14, No. 6, pp. 209–210 and 214 (Jun. 1969).

Unique Cooker Extruder, Food Engineering Intl., pp. 41–43 (May 1983).

Woollen, A., "Higher Productivity in Crispbread", *Cereal Foods World,* vol. 30, No. 5, pp. 333–334 (May 1985).

EXTRUSION BAKING OF COOKIES HAVING LIPOSOME ENCAPSULATED INGREDIENTS

FIELD OF THE INVENTION

The present invention relates to the production of cookies having a crumb-like structure using extrusion heat treatment and post extrusion baking. More specifically, the invention relates to a method of producing an extrusion-processed cookie having liposome-encapsulated compounds dispersed therein.

BACKGROUND OF THE INVENTION

In the production of a high oil containing farinaceous composition by extrusion cooking, mobility and immiscibility of the water and oil phases generally increase with increasing temperature. Additionally, the mechanical action of extruder screws tends to increase separation of oil from the remaining cookie mass. The tendency for the oil to separate is at locations within the extruder at which the components are subjected to the highest pressure. Exemplary of high pressure locations in a twin screw extruder are: (1) the space between the extruder screw tips and the die orifice, and (2) the narrowest or more restricted passageways between the left and right hand screw elements.

Oil separation under system pressure (screw or die pressure) can be manifested in extruder surging or uneven mass flow rates from the die. Upon extrusion from the die, separated oil may: (1) appear as a coating on the remaining dough mass, or (2) periodically discharge separately from the remaining dough mass. Non-homogeneous dough production and discontinuous extruder operation may thus result from oil separation. The problem of oil separation increases with increasing oil levels.

Water separation from flour, up to the boiling point of water, is generally not a problem because of the more hydrophilic properties of flour components such as gluten and starch. As flour and water temperatures are raised, increased migration of water into starch granules, protein (e.g. gluten) denaturization, and starch gelatinization tend to occur. The binding or reaction of water with flour components may promote separation of oil: (a) by making the flour components more polar or hydrophilic and (b) by creating a greater mass of hydrophilic components.

Conventional cookie production involves forming cookie dough preforms or pieces followed by baking of the pieces. Low temperatures, typically at about room temperature, are used to form the dough. The low temperature mixing generally avoids separation of shortening or fat from hydrophilic dough components. While baking temperatures in a conventional oven, such as a band oven, may promote oil separation, there is no mixing or pressing action performed at the baking temperatures. Any oil separation which may occur in such ovens does not generally interfere with continuous operability of the cookie production process as it would in a continuous cooker/extruder process.

In addition to high temperature mixing and high system pressure, the presence of sugar in a cookie dough may also increase oil and water separation. Solubilization of sugars in water increases the relative amount of the hydrophilic mass. This in turn may tend to promote oil separation.

The elimination or significant reduction of added water or a source of added water in a cooker extruder tends to reduce oil separation from hydrophilic cookie dough components at elevated temperatures. However, added water or a source of water is needed in cookie production for formability or machinability of cookie doughs into sheets or pieces at high production rates. Water also helps to disperse cookie ingredients and to promote flavor and color development.

Cooking of dough products changes the texture and the flavor of the dough. The temperatures experienced in the baking oven and in a cooker-extruder will produce many of the desirable flavors. However, the cooking temperatures will inherently destroy some of the desirable compositions in the food product. A number of additives are commonly added to dough products to improve the shelf-stability, color, and flavor of the dough product. Typically, these additives are combined during the dough mixing stage and subjected to the high cooking temperatures The high temperatures often result in a loss of the activity of the additive. Many flavoring compositions contain volatile compounds which dissipate during baking. Some antioxidants and vitamins may be destroyed during the heating step.

Efforts to overcome the loss of activity of these compounds during baking usually result in adding excessive amounts of the compound during mixing or, alternatively, applying a coating of the compound over the finished product after baking. These efforts have resulted in only limited success in obtaining satisfactory concentrations of additives. For example, many of the concentrated coatings tend to impart a bitter flavor to the food. Applying a coating of the compound does not facilitate sufficient penetration of the compound to the interior of the product and results in a high concentration on the surface and low concentration toward the center. In addition, a carrier is often needed in order to apply the compound and further tends to dilute the concentration of the compound. When an aqueous solution is sprayed onto the food product, the water must typically be removed to avoid an unacceptable moisture level on the surface. The coating compositions are typically further exposed to the atmosphere and to sunlight which may degrade or alter their activity over time. In the case of preservatives and antioxidants, it is preferable to have the compounds remain in the active form for an extended period of time, in order to prevent spoilage of the food product. Coating compositions of preservatives generally have a high initial activity, which decreases steadily as the product ages. Timed release of preservatives from a stabilized source tends to maintain a steady activity level.

Liposomes are known to be useful for encapsulating a number of components such as enzymes, cosmetics, perfumes, and pharmaceuticals. Most of the work with liposomes has been in the pharmaceutical field and has been aimed in delivering bioactive agents and drugs to a particular site in the patient. Liposomes have been used to a limited extent to deliver enzymes in cheese making.

Liposomes are essentially closed lipid bilayer membranes in the form of vesicles or sacs containing an entrapped aqueous core. Liposomes may be unilamellar or multilamellar lipid vesicles enclosing a three dimensional space. The membranes of liposomes are made up of a bimolecular layer of a lipid having a polar head and a non-polar tail. When lipids are dispersed in an aqueous solution, the polar heads of the lipids orient themselves outwardly to the aqueous solution and form a continuous outer surface. Unilamellar liposomes have a single lipid bilayer while multilamellar liposomes generally have a plurality of concentric lipid bilayers. The structure of the liposome provides a unique and convenient carrier for various components entrapped in the internal aqueous layer which is separated from the external aqueous environment.

In the process of the present invention, cookie products are produced using an extrusion cooker to promote Maillard browning and flavor development without the problems caused by the separation of oil from the remaining cookie dough mass. The extruded cookies or cookie-like products of the present invention have a cookie crumb or crumb-like structure and texture and exhibit structural integrity. The cookie-like products further contain a liposome-encapsulated additive.

SUMMARY OF THE INVENTION

The present invention provides a continuous process for the production of cookies containing liposome-encapsulated additives and which exhibit a cookie crumb-like structure and structural integrity using a cooker extruder and post extrusion heating, such as dielectric radio frequency baking, microwave baking, conductive baking, hot air baking, infra red heating, frying or combinations thereof. A cookie crumb-like structure is achieved by avoiding substantial starch gelatinization. Ingredients comprising flour and shortening or fat are admixed and heated in a cooker extruder. Preferably, the starch carrying ingredients are coated with the oil, and then water is added to the hot flour and oil mass during and/or after heat treatment. Using an amount of water such that the water content of the dough-like mixture is sufficiently low so as to avoid substantial starch gelatinization further assures that no or substantially no starch gelatinization occurs. The use of low water contents also tends to reduce oil separation from hydrophilic cookie dough components at elevated temperatures.

In embodiments of the present invention the ingredients are heated in the cooker extruder to a high temperature, for example at least about 150° F., to reduce post extrusion baking time, and promote Maillard browning and flavor development. Preferably, the ingredients are heated to a temperature of at least about 200° F., more preferably at least about 250° F., most preferably from about 300° F. to about 500° F., to obtain a heat-treated mass. The heat treated mass is formed at a relatively low pressure within the cooker extruder, generally less than about 20 bars absolute, preferably less than about 10 bars absolute.

Preferably, the heat treated mass temperature upon addition of or during admixing with water or a liquid source of water is from about 100° F. to about 300° F., more preferably from about 110° F. to about 212° F. If the heat treated mass temperature is too low, viscosity may deleteriously increase, mixing may be more difficult, pressure may increase and substantial oil separation or surging may occur. Also, higher temperatures in the cooker extruder reduce post extrusion heating times.

In embodiments of the present invention, the heat treated mass is cooled and admixed at low pressures with liquid water or a source of water and optional sugar to obtain a substantially homogeneous dough-like mixture. The heat treated mass is cooled to a sufficiently low temperature so that upon its encountering of points of high pressure, the added water does not cause substantial oil separation and extruder surging. Cooling of the heat treated mass is preferably initiated prior to and continues after addition of the water. The temperature of the dough-like mixture which is formed is most preferably less than about 150° F. but above about 100° F. at the exit end of the extruder.

A liposome-encapsulated additive is admixed with the heat treated mass at a sufficiently low temperature such that the rupture of the liposomes is substantially inhibited. The temperature of the heat treated mass is reduced, for example, to about 140° F., preferably 130° F. before admixing the liposome-encapsulated additive to prevent rupture of the liposomes and release of the encapsulant.

The added shortening or fat content of the doughlike mixture may, for example, be from about 12% by weight to about 40% by weight, preferably from about 20% by weight to about 30% by weight, based upon the weight of the dough-like mixture.

The elimination or significant reduction of added water or a source of added water in a cooker extruder tends to reduce oil separation from hydrophilic cookie dough components at elevated temperatures. It also reduces post extrusion heating time. However, added water or a source of water is needed in cookie production for formability or machinability of cookie doughs into sheets or pieces at high production rates. Water also helps to disperse cookie ingredients and to promote flavor and color development.

In the present invention, preferably the amount of water added is less than the amount needed to reach a threshold or maximum consistency. In preferred embodiments of the present invention, the amount of water added to the heat treated mass may range from about 0.5% by weight to about 10% by weight, based upon the weight of the dough-like mixture. It may, for example, be from about 2% by weight to about 6% by weight, based upon the weight of the dough-like mixture, depending upon the heat treatment temperatures and the desired consistency for shaping or forming.

The water content of the dough-like mixture is preferably as low as possible to reduce post extrusion heating time and to reduce the risk of substantial oil separation and extruder surging. It is generally less than about 20% by weight, preferably less than about 15% by weight, more preferably less than about 10% by weight, based upon the weight of the dough-like mixture.

Process compatible ingredients can be added to adjust the texture of the products produced by the process of the present invention. For example, the relative amount of at least one solid, crystalline, or granulated sugar, such as sucrose, which is subjected to the heat treatment can be used to control the tenderness and crunchiness of the final product. Addition of a solid, or crystalline or granulated sugar, such as sucrose, and subjecting it to high extrusion temperatures tends to melt and/or dissolve the sugar crystals and thus promote a crunchy texture in the final product. Addition of all or a portion of the solid sugar to the cooled mass rather than subjecting it to high extrusion temperatures tends to avoid sugar melting and/or dissolution, and promotes a tender texture in the final product. In embodiments of this invention the sugar component may be added in an amount to provide, for example, from about 10% by weight to about 40% by weight, preferably from about 20% by weight to about 30% by weight total sugar solids, based upon the total weight of the dough-like mixture. Crystalline or granulated sucrose alone or used with other sugars is preferred.

The additive is encapsulated in the aqueous layers or the lipid bilayers of liposomes. The liposomes may be in the form of an aqueous dispersion or a gel. Liposomes are inherently stable structures and are able to stabilize the encapsulated material for extended periods of time. The physical and chemical characteristics of the phospholipid from which the bilayer is produced and any additive (i.e. cholesterol) incorporated into the bilayer, will determine the permeability of a given encapsulated material through the liposome membrane. Liposomes are heat sensitive and rupture readily at elevated temperatures and can therefore be used as a heat-activated or heat-released system in food products.

Liposomes are able to encapsulate any number of different compounds or materials that are soluble or dispersible in an aqueous medium or lipidic medium. The preferred liposomes are prepared by the reverse-phase evaporation technique, which is well known in the art. The liposome dispersion thus formed can be used without further modification or can be concentrated by removal of the external bulk aqueous phase by certain well-known techniques, such as centrifugation or filtration.

The phase transition temperature of the liposomes can be selected such that the encapsulants are readily released when the cookies are heated sufficiently or eaten by the consumer. When flavors are encapsulated, the liposomes preferably have a phase transition temperature such that the liposomes melt and rupture in the mouth, and thereby release the flavor. Suitable encapsulants include flavorants, acidulants, preservatives, antioxidants, and vitamins. The liposomes may release the encapsulant over a period of time. The rate of the release depends on the encapsulant, the lipid bilayer composition, the concentration of the encapsulant, and the phase transition temperature of the lipid.

Dough-like mixtures of the present invention are extrudable through a die into a continuous rope or sheet. The pressure drop upon extrusion or across the extruder die is generally less than about 20 bars absolute, preferably less than about 10 bars absolute. The work done on the dough-like mixture, defined as the specific mechanical energy is generally low, for example less than about 40 watt-hrs/kg (or 18 watt-hrs/lb). Preferably, substantial frictional heating does not occur in the cooker extruder with substantially all of the heating being provided by external or jacketed heaters.

Puffing or expansion due to moisture or steam release upon exiting of the dough-like mass from the extruder typically does not occur. The extrudate is formed into pieces and the pieces are leavened and further browned by subjecting them to at least one other heating source, such as a microwave oven, infrared oven, convection oven, dielectric radio frequency oven, a fryer, or conductive heater, to obtain cookie products which exhibit structural integrity and a crumb-like structure and texture. Generally, the volume increase upon post extrusion heating ranges from about 20% to about 200%. The baking time to leaven the cookie pieces is sufficiently short to allow at least some of the liposomes to remain intact.

Leavening agents are optional and may be included in amounts up to about 5% by weight, based upon the weight of the dough-like mixture. Dough-like mixtures of the present invention having a shelf-stable water activity of less than about 0.7, preferably less than about 0.6 may be packaged as shelf stable products in moisture and oxygen impermeable packaging materials for subsequent leavening and browning in conventional home microwave or convection ovens.

DETAILED DESCRIPTION OF THE INVENTION

The present invention is directed to a method of preparing a baked cookie containing a stabilized composition. The method according to the invention provides an effective means for introducing a stabilized component into a partially-baked cookie composition. One can select liposomes that release the encapsulant at a steady rate over a period of time or that release the encapsulant on demand by the application of heat sufficient to rupture the liposomes. The stabilized components are encapsulated in the aqueous layers or in the lipid bilayers of liposomes, as discussed hereinafter in greater detail.

The invention is primarily directed to a finished cookie product having a liposome-encapsulated additive, such as a flavor, flavor enhancer, preservative, or pH-sensitive component. The encapsulants may include a coloring agent, enzyme, edible acidulant, sweetener such as aspartame or saccharine, vitamin, UV absorber, antioxidant, oleoresin, or fragrance. Liposomes have a unique structural integrity and are able to encapsulate a material and thereby provide a stabilizing effect. Their structural characteristics make liposomes an excellent carrier for materials that are not otherwise easily dispersible in liquids. The lipid bilayers of the liposome encapsulate the material and form a barrier to isolate the encapsulant from the external medium. Liposomes can be dispersed in aqueous systems and in lipidic systems and can therefore be dispersed in a cookie composition regardless of the fat or moisture content of the composition.

The unique properties of liposomes provide a means for stabilizing many normally unstable compounds. The stability of the liposome is dependent, in part, on the phase transition temperature of the lipid. Lipids having a phase transition temperature above room temperature are generally considered solids at room temperature while lipids having a phase transition temperature below room temperature are fluids at room temperature. At a given storage temperature below the phase transition temperature of two different lipid-liposomes prepared from the lipid having the high phase transition temperature are considered more stable at higher temperatures than those formed from the lipids having the lower phase transition temperature. By selecting the lipid based on its phase transition temperature, one can produce liposomes that will rupture within a reasonably predictable temperature range and release the encapsulant. For example, if a liposome-encapsulated flavoring agent is to be released in the mouth when a product is eaten, the phase transition temperature of the lipid should be slightly below body temperature. The phase transition temperature of the liposome-forming lipids can range between 80° F. and 140° F. The preferred range is 100° F. to 140° F.

The phase transition temperature of the lipid further affects the rate of release of the encapsulant over an extended period of time. Liposomes are sensitive to changes in the osmotic pressure of the external bulk aqueous phase in which they are suspended. Water molecules pass freely through the membrane in response to increases or decreases in osmotic of the external aqueous phase relative to the internal osmotic pressure of the liposome. Liposome membranes, however, present a diffusional barrier to larger and/or charged molecules. The ability of the encapsulant to diffuse through the lipid wall can be reduced by selecting a lipid having a high-phase transition temperature. At temperatures above the phase transition temperature, the encapsulant will generally diffuse readily through the lipid wall, although the liposome structure may still remain intact.

Alternatively, where a high rate of release is desired, a lipid with a lower phase transition temperature can be used, so that the liposomes will rupture when subjected to heat. At temperatures above the phase transition temperature of the lipid, the liposome may not rupture, but the fatty acyl groups of the phospholipid "melt" and become no longer associated in a condensed, crystalline array. The membrane exits in this expanded state, so that the rate of release of the encapsulant is substantially increased. The heat activated liposomes can be used to release flavors, fragrances, and browning agents when heated in a convection oven or microwave oven.

The liposomes may be prepared by the REV method (reverse-phase evaporation). Liposome vesicles produced by this method are able to contain a large volume of entrapped materials. Other methods of preparing liposomes can also be used successfully. The REV procedure is disclosed in U.S. Pat. No. 4,235,871 to Szoka et al. and "Procedure for the Preparation Of Liposomes With Large Internal Aqueous Space And High Capture By Reverse-Phase Evaporation", *Proc. Nat'l Acad. Sci. U.S.A.*, Vol. 75, pp. 4194–4498 (1978).

The liposomes, according to the REV procedure, are prepared by dissolving a suitable liposome-forming lipid such as a phosphatidylcholine, in an organic solvent. The solvent is then evaporated under vacuum to produce a waxy lipid film on the wall of the vessel. The lipid is then redissolved in an organic solvent, and an aqueous solution is added to the vessel and mixed to disperse the lipid and produce a liposome suspension. The liposomes are formed as a liposome dispersion, via a mixing step such as by stirring, homogenizing, or sonicating. The dispersion is then centrifuged or dialyzed to remove any unencapsulated material. By this method, the liposomes will usually contain about 20% by weight of the encapsulated component.

The typical liposome-forming lipids which form the lipid bilayer are the phospholipids of choline such as egg phosphatidylcholine, dilauryloylphosphatidylcholine, dimyristoylphosphatidylcholine, dipalmitoylphosphatidylcholine, distearoylphosphatidylcholine, 1-palmitoyl-2-myristoylphosphatidylcholine, 1-stearoyl-2-dipalmitoylphosphatidylcholine, 1-palmitoyl-2-stearoylphosphatidylcholine and dioleoylphosphatidylcholine.

To further strengthen the vesicle wall and reduce the permeability of the liposome, a number of other stabilizing lipids can be combined with the phospholipid. Examples of such commonly used stabilizing lipids include sterols, such as cholesterol, aliphatic amines, long-chain sulfates and phosphates, dicetyl phosphate, butylated hydroxytoluene, tocopherol, retinol and the isoprenoid compounds. The amount of the stabilizing lipid used will depend on the particular phospholipid, and the desired characteristics of the liposomes. Generally, the amount of stabilizer will not be greater than the amount of the phospholipid. The liposomes prepared according to the invention are stable for the intended use and do not generally require a stabilizer.

Other phospholipids that can also be used successfully in practicing the invention include phosphatidic acid, phosphatidylserine, phosphatidylethanolamine, spingolipids, phosphatidylglycerol, sphingomyelin, cardiolipin, glycolipids, gangliosides, cerebrosides, such as dilauryloylphosphatidylglycerol, dipalmitoylphosphatidylglycerol, distearoylphosphatidylglycerol, dioleoylphosphatidylglycerol, dimyristoylphosphatidic acid, dipalmitoylphosphatidic acid, dimyristoylphosphatidylethanolamine, dipalmitoylphosphatidylethanolamine, dimyristoylphosphatidylserine, dipalmitoylphosphatidylserine, dipalmitoylsphingomyelin, and distearoylsphingomyelin.

The liposomes prepared by the above methods are in the form of an aqueous dispersion. For addition to the cookie mixture, it is desirable to remove the excess water. The volume of the dispersion can be reduced by using a rotary evaporator under reduced pressure. This method produces a viscous gel that can be redispersed in an aqueous phase to a pumpable consistency or combined directly with the cookie mixture, as discussed hereinafter in detail. Alternatively, the liposome gel can be dispersed in a sugar solution or syrup to be introduced to the cookie dough-like mixture. The liposomes can also be dried by freeze-drying, as is known in the art, and then dispersed in fat or oil for mixing with the cookie composition or added directly to the cookie composition.

The flour component may be any comminuted cereal grain or edible seed meal, derivatives thereof and mixtures thereof. Exemplary of the flour components which may be used are wheat flour, corn flour, oat flour, barley flour, rye flour, rice flour, potato flour, grain sorghum flour, corn starch, physically and/or chemically modified flours or starches, such as pregelatinized starches, and mixtures thereof. The flour may be bleached or unbleached. Wheat flour or mixtures of wheat flour with other grain flours are preferred. The amount of flour used in the compositions of the present invention ranges, for example, from about 30% by weight to about 70% by weight, preferably from about 45% by weight to about 55% by weight. Unless otherwise indicated, all weight percentages are based upon the total weight of all ingredients forming the dough-like mixtures or formulations of the present invention except for inclusions such as flavor chips, nuts, raisins, and the like. Thus, "the weight of the dough-like mixture" does not include the weight of inclusions.

The flour may be replaced in whole or in part by flour substitutes or bulking agents such as, polydextrose, hollocellulose, microcrystalline cellulose, mixtures thereof, and the like. Corn bran, wheat bran, oat bran, rice bran, mixtures thereof, and the like, may also be substituted in whole or in part for the flour for making a fiber enriched product, to enhance color, or to affect texture.

Corn flour and/or wheat bran may be used, for example, to enhance color and affect texture. Exemplary amounts range up to about 15% by weight corn flour and up to about 20% by weight wheat bran, the percentages being based upon the total weight of ingredients forming the dough-like mixture. Preferably, the corn flour and wheat bran will each comprise from about 1 to about 10% by weight, more preferably from about 2% by weight to about 5% by weight, based upon the weight of the dough-like mixture.

The shortening or fat used in the present invention may be any edible fat or oil or mixture thereof suitable for baking applications and may include conventional food-grade emulsifiers. Vegetable oils, lard, marine oils, and mixtures thereof which are fractionated, partially hydrogenated, and/or interesterified are exemplary of the shortenings or fats which may be used in the present invention. Edible reduced or low calorie, or non-digestible fats, fat substitutes, or synthetic fats, such as sucrose polyesters which are process compatible may also be used. The shortenings or fats may be solid or fluid at room temperatures of from about 75° F. to about 90° F. The use of components which are solid or semi-solid at room temperatures are preferred so as to avoid possible oil seepage from the final product during storage. The shortening or fat component is preferably added to the extruder in the form of a heated oil to facilitate metering, mixing, and a fast heat up of the added ingredients.

Generally, the amount of the shortening or fat component admixed with the flour component is, for example, at least about 12% by weight, and may, for example, go up to about 40% by weight, based upon the weight of the dough-like mixture. It preferably ranges from about 20% by weight to about 30% by weight, based upon the weight of the dough-like mixture.

Exemplary emulsifiers which can be used include lecithin, sorbitan monostearate, mono- and/or diglycerides, polyoxyethylene sorbitan fatty acid esters, such as polysorbates (e.g., polyoxyethylene (20) sorbitan monostearate), and sodium stearoyl-2-lactate. Exemplary amounts are up to about 3% by weight of one or more emulsifiers based upon the weight of the flour.

Process compatible ingredients which ca be used to modify the texture of the products produced in the present invention include sugars such as sucrose, fructose, lactose, dextrose, galactose, maltodextrins, corn syrup solids, hydrogenated starch hydrolysates, protein hydrolysates, mixtures thereof, and the like. Reducing sugars, such as fructose, maltose, lactose, and dextrose or mixtures of reducing sugars may be used to promote browning. Fructose is the preferred reducing sugar, because of its ready availability and its generally more enhanced browning and flavor development effects. Exemplary sources of fructose include invert syrup, corn syrup, high fructose corn syrup, molasses, brown sugar, maple syrup, mixtures thereof, and the like.

The texturizing ingredient, such as sugar may be admixed with the other ingredients in either solid or crystalline form, such as crystalline or granulated sucrose, granulated brown sugar, or crystalline fructose, or in liquid form, such as sucrose syrup or high fructose corn syrup. Humectant sugars, such as high fructose corn syrup, may be used to promote chewiness in the post-extrusion baked product.

In embodiments of the present invention, the total sugar solids content, or the texturizing ingredient content, of the dough-like mixtures of the present invention is, for example, at least about 10% by weight, and may, for example, go up to about 40% by weight, based upon the weight of the dough-like mixture. It preferably ranges from about 20% by weight to about 30% by weight, based upon the weight of the dough-like mixture.

Crystalline or granulated sucrose alone or with other sugars is preferred in the present invention. The sucrose content may, for example, be at least about 80% by weight, based upon the total sugar solids content of the dough-like mixture. The balance of the sugar solids may comprise fructose, dextrose, lactose, or mixtures thereof, for example. Sugar granulations which may be used range, for example, from about 4X to about 12X.

The moisture contents of the dough-like mixtures of the present invention should be sufficient to provide the desired consistency to enable proper forming, machining, and cutting of the dough. The total moisture content of the dough-like compositions of the present invention will include any water included as a separately added ingredient, as well as the moisture provided by flour (which usually contains about 12% to about 14% by weight moisture), and the moisture content of other dough additives included in the formulation, such as high fructose corn syrup, invert syrups, or other liquid humectants and the external water of the liposomes. The internal water of the liposomes is physically isolated from the cookie mass and does not have a major impact on the consistency of the dough-like mixture or the fat separation.

Taking into account all sources of moisture in the dough-like mixture including separately added water, the total moisture content of the dough-like mixtures of the present invention is generally less than about 20% by weight, preferably less than about 15% by weight, more preferably less than about 10% by weight, based upon the weight of the dough-like mixture. The dough-like compositions of the present invention generally have a water o moisture content of at least about 5% by weight, based upon the weight of the dough-like composition.

Generally, if the amount of added water is too low, the extrudate will tend to be slurry-like and cannot be cut into pieces. As the amount of water is increased the extrudate consistency increases, until a threshold level is reached. At this level, additional water reduces the consistency. However, as the amount of water is increased to reduce the consistency, there is an increased risk of substantial oil separation and extruder surging. The lower the pressure and/or temperature to which the heat treated mass is subjected to after water addition: the lower is the risk. Thus, adding an extrusion die to the extruder: (a) increases the pressures encountered by the ingredients in the extruder which, (b) increases the risk that the addition of water beyond the amount needed to reach the threshold level of consistency will result in oil separation which can reduce machinability.

The consistency of the extrudate can be determined by measuring the force needed to penetrate a sample at a constant rate of penetration. An Instron Texture Analyzer Model 4202 can be used to determine the modulus of the sample, which is a measurement of the consistency of the sample. The modulus is the slope, in the linear region, of a plot of the strain or deformation (x-axis) versus the stress (y-axis). The strain can be measured in inches and the stress can be measured in lbs force. A cylindrical shaped probe having a diameter of 4 mm can be used for the measurement of the consistency. The probe can be set to penetrate the sample at a constant speed of 0.2 inches/min. The sample dimensions can be about 1 inch square and ¼ inch high, or thick. The sample temperature can be room temperature (about 70–75° F.) or higher. The more force required to penetrate the sample, the greater is its modulus and the greater is its consistency.

Consistencies suitable for forming or cutting operations depend upon the particular operation and particular equipment utilized. For example, a consistency which is too high for wire cutting may be suitable for sheeting or rotary molding. For rotary molding, the consistency at about the threshold level is suitable. For extrusion through a die, for producing a sheet for example, or for wire cutting, the consistency should be less than the threshold value. However, to reduce the risk of substantial oil separation in the extruder or in post extrusion forming operations and to reduce post extrusion baking times, it is generally preferred that the amount of water added be less than the amount needed to reach the threshold or maximum consistency. Thus, it is generally preferred that the water content of the dough-like mixture is such that additional water will increase the consistency of the dough-like mixture.

If the ratios of the amounts of the other ingredients are kept constant then: the amount of water added which is needed to reach the threshold level of consistency will depend upon the heat treatment of the ingredients. Generally, the longer the heating, or the higher the temperature of heating, the lower is the amount of water needed to reach the threshold level of consistency.

In preferred embodiments of the present invention, the amount of water admixed with the heat treated mass may range, for example, from about 0.5% by weight to about 10% by weight, based upon the weight of the dough-like mixture. Depending upon the time and intensity of heat treatment and the consistency needed for shaping or forming, and the pressures involved, it may be more preferably from about 2% by weight to about 6% by weight, based upon the weight of the dough-like mixture.

The added water may be in the form of pure or tap water, a liquid source of water, such as sucrose syrup, corn syrup, high fructose corn syrup, eggs, honey, molasses, mixtures thereof, and the like, alone or in combination with a dry source of water, such as the moisture content of dried eggs, corn syrup solids, and the like. Water, in the form of tap water or a liquid source of water, such as high fructose corn syrup, for example, may also be added in the heat treating stage. It may be added with the flour for example, in low amounts (e.g. less than about 2% by weight, based upon the weight of the dough-like mixture) which do not result in: (a) substantial oil separation or extruder surging or, (b) substantial starch gelatinization.

In addition to the foregoing, the dough-like mixtures of the invention may include other additives conventionally employed in cookies. Such additives may include, for example, milk by-products, egg or egg by-products, cocoa, vanilla or other flavorings, as well as inclusions such as nuts, raisins, coconut, flavored chips such as chocolate chips, butterscotch chips and caramel chips, and the like.

A source of protein which is suitable for inclusion in baked goods may be included in the dough-like compositions of the present invention to promote Maillard browning. The source of protein includes non-fat dry milk solids, dried or powdered eggs, mixtures thereof, and the like. The amount of the proteinaceous source may, for example, range up to about 5% by weight, based upon the weight of the dough-like mixture.

The dough-like cookie compositions of the present invention may contain up to about 5% by weight of a leavening system, based upon the weight of the dough-like mixture. Chemical leavening agents or injected gases such as carbon dioxide can be used, but are not necessary for leavening the dough-like compositions of the present invention. Leavening action may be achieved by post extrusion heating of the composition which is sufficient to vaporize water in the dough-like cookie composition. However, the leavening agents may be used to adjust or control the degree of leavening and/or to control the pH of the cookie products.

The inclusion of a leavening agent or other edible pH-adjusting agents may promote browning of the cookie mixture during processing within the extruder or during post-extrusion heating. A desired pH for the cookies or the dough-like mass is from about 5 to about 9.5, preferably from about 7 to 8.5. Generally, the more alkaline the composition, the greater the degree of browning. However, the pH should be adjusted so as not to adversely affect taste of the final product. A higher pH may be used to promote browning when forming the heat treated mass of the present invention, followed by adjustment of the pH after and/or during cooling of the heat treated mass. Exemplary of chemical leavening agents or pH adjusting agents which may be used include alkaline materials and acidic materials such as sodium bicarbonate, ammonium bicarbonate, sodium acid pyrophosphate, tartaric acid, mixtures thereof, and the like.

In the process of the present invention, the flour component and shortening or fat are continuously and separately fed into the upstream portion of a cooker extruder. One or more crystalline or granulated sugars may be continuously added or preblended with the flour. However, continuous separate addition of the crystalline sugar to the upstream end of the extruder is preferred to avoid particle separation in the dry blend. The flour component, the shortening or fat, and the sugar components are generally initially conveyed in the extruder with cooling or without the application of external heat. They are conveyed and admixed while being heated to obtain a heat treated mass.

In the present invention, the ingredients may be heated to temperatures above the minimum gelatinization temperature of the starch (assuming that a sufficient amount of water was available for reaction with the starch) but no or substantially no gelatinization (measured by differential scanning calorimetry) occurs. It is desireable that the oil sufficiently coats the starch containing flour particles to prevent substantial penetration of moisture into the starch granules so as to avoid substantial gelatinization.

A cookie crumb-like structure is obtained by avoiding substantial starch gelatinization. Generally, starch gelatinization occurs when: (a) water in a sufficient amount, generally at least about 30% by weight, based upon the weight of the starch, is added to and mixed with starch and, (b) the temperature of the starch is raised to at least about 80° C. (176° F.), preferably 100° C. (212° F.) or more. The gelatinization temperature may depend upon the amount of water available for reaction with the starch. The lower the amount of available water, generally, the higher the gelatinization temperature. Gelatinization may be defined as the collapse (disruption) of molecular orders within the starch granule manifested in irreversible changes in property such as granular swelling, native crystallite melting, loss of birefringence, and starch solubilization. The point of initial gelatinization and the range over which it occurs is governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al, "The Terminology And Methodology Associated With Basic Starch Phenomenon," *Cereal Foods World*, Vol. 33, No. 3, Pgs. 306-311 (March 1988).

In the present invention, conditions under which no or substantially no gelatinization is preferably achieved are by embedding or coating the starch carrying ingredients, such as wheat flour, within the oil and then adding the water to the flour and oil mass. No or substantially no gelatinization may also be further assured by: (a) reducing or substantially eliminating the addition of water, and/or (b) admixing the water with the heat treated mass below the minimum temperature at which starch gelatinization can occur.

In the process of the present invention, heating of the flour, shortening or fat, and sugar at as high a temperature as possible and for as long as possible for a maximum throughput rate without burning or other deleterious effects, is generally desirable for the development of browning and flavor. Maillard browning and flavor development involve the reaction between a reactive carbonyl group of a carbohydrate and a primary amino acid of the composition. The reaction proceeds through a series of intermediate reactions to finally produce the brown nitrogenous polymers. The heat treating step is believed to at least develop precursors to the polymeric nitrogen containing compounds. During the post-extrusion baking step, the colors develop faster than an uncooked dough under similar baking conditions.

The flour component, shortening or fat component, and optionally the sugar or other texturizing components are heated in the cooker extruder generally to a temperature of at least about 150° F., preferably at least about 200° F., more preferably at least about 250° F., and most preferably from about 300° F. to about 500° F. The average residence time for the flour, shortening or fat, and optional sugar components at these elevated temperatures is, for example, from about 15 seconds to about 90 seconds.

The heat treated mass is formed at a relatively low pressure within the cooker extruder. Pressures during the heat treating stage are generally less than about 20 bars absolute, preferably less than about 10 bars absolute. It is believed that the use of low pressures in the cooker extruder reduces the tendency for oil to separate from the remaining cookie ingredients. Preferably, substantially no frictional heating occurs in the cooker extruder. Substantially all of the heating is preferably supplied by external or jacketed heating means. Generally, the work done in the production of the dough-like mixture is low, for example, less than about 40 watt hrs/kg (or less than about 18 watt hrs/lb).

The heat treated mass temperature before and/or during admixing with water or a liquid source of water should be sufficiently low so that the added water does not result in substantial separation of oil and extruder surging. The reduction of the temperature of the heat treated mass substantially reduces mobility and immiscibility of the water and oil phases. Also, it has been observed that the oil is most likely to separate from the remaining mass at the points of highest pressure, such as at the extruder die. Generally, the lower the pressures encountered by the heat treated mass upon or subsequent to the addition of the water, the less the heat treated mass needs to be cooled to avoid substantial oil separation and extruder surging.

If the heat treated mass temperature is too low upon and/or during admixing it with the water or liquid source of water, viscosity may deleteriously increase. This may result in mixing difficulties, pressure increases, and substantial oil separation and extruder surging. Additionally, the less cooling performed within the extruder, the less is the amount of post extrusion heating needed for leavening.

If pressures are sufficiently low (such as when an extruder die is not utilized) and if the mass temperature during heat treatment is sufficiently low, no or substantially no cooling may be needed to avoid substantial oil separation or extruder surging. However, higher heat treated mass temperatures are preferred for: (1) the promotion of browning and flavor development, and (2) reduced post extrusion heating times. Thus, it is generally preferred that the heat treated mass be heated to a high temperature, for example about 300° F. to about 500° F., and that the heat treated mass temperature be reduced, as needed to avoid substantial oil separation or extruder surging, before and/or during admixing it with water or a liquid source of water. Cooling of the heat treated mass is preferably initiated prior to and continues during admixing it with water or a liquid source of water to reduce the risk of substantial oil separation upon mixing or extrusion.

Preferably, the heat treated mass temperature upon addition of water or a liquid source of water is from about 100° F. to about 300° F., more preferably from about 110° F. to about 212° F. Generally, the heat treated mass undergoes a temperature drop of at least about 35° F., preferably at least about 50° F. before and/or during admixing it with the water or liquid source of water. The heat treated mass is preferably cooled to a temperature below the boiling point of water (212° F.), more preferably to a temperature lower than about 200° F., most preferably less than about 150° F. before or during admixing it with the water or liquid source of water to reduce the risk of substantial steam generation, and substantial oil separation and extruder surging. Admixing the water or liquid source of water with the heat treated mass at a mass temperature which is lower than the minimum gelatinization temperature of the starches included in the formulation may further assure that no or substantially no starch gelatinization occurs, particularly as the amount of water is increased.

The temperature of the heat treated mass is typically reduced to a temperature below about 140° F., preferably below about 130° F. before the liposome-encapsulated component is admixed with the mass. Reducing the temperature of the heat treated mass below about 140° F. reduces excessive rupture of the liposomes. The liposomes may be added to the extruder toward the discharge end such that the liposomes are not subjected to excessive mixing. The amount of liposomes present is sufficient to provide, for example, about 1% to about 10% by weight of the encapsulant based on the weight of the cookie mixture.

In the preferred embodiment, the heat treated mass is admixed in the extruder with the liposome-encapsulated component. The consistency of the heat treated mass should be such that the shear in the extruder does not rupture the liposomes. The ingredients are preferably extruded as a dough-like mixture and formed into cookie pieces which can be baked to a finished cookie. The heat treatment of the ingredients reduces the baking time compared to conventionally prepared cookie doughs. The reduced baking time enables a substantial portion of the liposomes to remain intact. The extent of rupture of the liposomes will depend, in part, on the temperature and duration of the baking. In this manner, the rate of release of the encapsulant can be controlled by the baking step.

In one embodiment of the invention, the liposomes may be selected to rupture, for example, at the post-extrusion heating temperature. In this manner, the liposomes are able to release the encapsulant to the product by the application of heat. Suitable encapsulants may include flavors or fragrances to enhance the aroma of the product as it is removed from the oven. In this embodiment, the partially-baked cookie preforms may be packaged without the post-extrusion baking step. The consumer may then finished the baking of the preforms in an oven to obtain a leavened, freshly baked product.

The liposomes can encapsulate any number of desirable compounds. For example, a flavoring or flavoring enchancer can be liposome-encapsulated and then mixed in the cookie composition. When the consumer eats the cookie, the liposomes can rupture to release the flavoring. An alternative embodiment, the encapsulant may be a volatile, fragrant compound. When the cookie is reheated in a convection oven or a microwave oven by the consumer, the liposomes will rupture and release a fresh aroma and flavor similar those of to those of a freshly baked cookie. Liposomes can further provide a sustained release of a preservative, antioxidant, or pH-sensitive component, such as aspartame or vitamins. Cookie compositions may use, for example, alkaline leavening agents, such as sodium bicarbonate, which raise the pH of the dough-like mixture. Aspartame, however, is more stable in acidic environments. By encapsulating the aspartame in the liposome, one can maintain the aspartame in its stable form for a longer period of time.

At the exit end prior to or at the optional extruder die, which is generally the point of maximum pressure, the temperature of the dough-like mixture which is formed in the extruder should be less than the boiling point of water (212° F.), more preferably less than about 200° F., most preferably less than about 140° F. to prevent excessive rupture of the liposomes. Generally, the temperature of the heat treated mass and dough-like mixture in the extruder should not be reduced to below about 100° F., for example, to avoid mixing difficulties, increased pressure, or increased risk of substantial oil separation or extruder surging due, for example, to increased viscosity or oil solidification. Also, excessively low extrudate temperatures may impair post extrusion forming, shaping, and cutting operations. Increased post extrusion heating times and/or temperatures for leavening purposes also result from excessive cooling.

In producing the dough-like mixtures in accordance with the present invention it is preferred that substantially no moisture content reduction occurs and that the dough-like mixture retains a sufficient amount of water for proper leavening during post extrusion heating.

All or a portion of the texturizing ingredient, such as solid, crystalline or granulated sugar, may be admixed with the cooled heat treated mass at the same or at a different location from addition of the water or other aqueous source to control the texture of the final baked product.

Addition of a solid, crystalline or granulated sugar, such as sucrose, and subjecting it to high extrusion temperatures tends to promote sugar melting and/or dissolution and thus a crunchy texture in the final product. Addition of all or a portion of the crystalline sugar to the cooled mass rather than subjecting it to high extrusion temperatures tends to avoid excessive sugar melting, and/or solubilization and promotes a tender texture in the final product. Thus, all, a portion (e.g. about 15% to about 85% by weight, based upon the total amount of solid, crystalline or granulated sugars), or none of the solid or crystalline sugars may be subjected to the heat treating stage to control texture in the final, post extrusion baked product.

Also, the greater the degree, or portion of sugar melting and/or dissolving, the less the viscosity of the extrudate. Accordingly, the relative amounts of solid or crystalline sugar: (a) subjected to heat treatment upstream, and (b) subjected only to the downstream cooling stage may be used to control the extrudate viscosity for subsequent forming or machining, and/or to control the texture of the final baked good.

The downstream addition of a texturizing ingredient, such as sugar, reduces the mass subjected to heat treatment which permits heating of the upstream ingredients to a higher temperature at a given throughput rate. Also, the downstream addition of the texturizing ingredient such as sugar, which is at a relatively low temperature (e.g. about room temperature) helps to cool the heat treated mass.

Various granulations may also be used to control the degree of sugar melting and/or dissolving, with larger sizes tending to result in less melting or dissolving. The addition of liquid sugar, such as sucrose syrup, may additionally promote crunchiness of the final product.

The residence time of the added liquid water or added liquid source of water, as well as the residence time of the texturizing ingredient, such as sugar, added downstream after initiation of the reduction of the heat treated mass temperature should be sufficient to enable the attainment of a substantially homogeneous dough-like mixture. The residence time in the cooling or reduced temperature stage should also be sufficiently long to reduce the mass temperature so as to avoid substantial expansion or puffing of the dough-like mass upon extrusion. The average residence time in the cooker extruder of the water and crystalline sugar added to the heat treated mass may, for example, be from about 10 seconds to about 60 seconds.

Just prior to extrusion, or upon extrusion through an extruder die, the dough-like mixture may be heated, for example, by about 5° F. to about 30° F. This heating may be used to adjust dough consistency or viscosity provided that adverse oil separation or extruder surging does not occur. The post cooling heating may be used, for example, for controlling flow in the die, particularly at low moisture contents.

The pressure in the cooling stage is generally less than about 20 bars absolute, preferably less than about 10 bars absolute. The pressure drop across the extrusion die is generally less than about 20 bars and preferably less than about 10 bars. Low pressures are preferred to avoid separation of oil from the remaining mass and to avoid surging.

The leavening agents or pH adjusters may be added to the cooled mass in the cooling stage or they may be added prior to the cooling stage. They may be added in dry form either separately or as a pre-blend with the flour or solid or crystalline sugar, for example. They may also be added in aqueous form separately or as part of the added water. Emulsifiers may suitably be added with the shortening or fat in the heating stage or with the water in the cooling stage of the process of the present invention.

Ingredients which promote Maillard browning, such as proteinaceous materials and reducing sugars are preferably added in the heat treating stage. The dry ingredients may, for example, be preblended with the flour or added separately. The proteinaceous materials and the reducing sugars may also be added in the cooling stage depending upon the degree of browning desired, and the water content of the ingredients. These ingredients, as well as any other additives in dry form may be preblended with the upstream or downstream sugar, for example, or added separately therefrom. Likewise, additives which are in liquid form may be preblended with the added water or liquid source of water or they may be separately added to the extruder. Generally, preblending of minor ingredients for addition to the extruder is preferred for achieving homogeneity.

Heat labile ingredients, such as various vitamins, minerals, flavorings, coloring agents, sweeteners, such as aspartame, and the like, are preferably added in the cooling stage so as to reduce the possibility of thermal decomposition or degradation. The heat labile ingredients may, for example, be preblended with sugar added downstream in the cooling stage or with the added water. They may also be added separately, for instance downstream of the sugar or water addition.

Shear sensitive ingredients, such as chocolate chips or other flavored chips, raisins, nuts, fruit pieces or other inclusions or particulates are preferably added to the cooling stage. The shear sensitive ingredients are most preferably added downstream of the downstream sugar and water addition. Adding the shear sensitive ingredients near the exit or in the last barrel section of the extruder serves to maintain particle integrity by reducing their exposure to the mechanical action of the screw elements. Flavor chips, such as chocolate chips may be added at temperatures below room temperature, for example at about 20° F. to about 65° F. so as to reduce melting of the chips in the dough-like mixture.

The dough-like mixture is extruded from the cooker extruder to obtain an extrudate without substantial moisture loss or flashing because the temperature of the dough-like mixture exiting the extruder is less than about 212° F. The extruded dough-like mixtures of the present invention will preferably have a shelf-stable water activity of less than about 0.7, preferably less than about 0.6. The shelf-stable compositions of the present invention may be packaged as shelf stable products in moisture and oxygen impermeable packaging materials for subsequent leavening and browning in a post extrusion oven such as a conventional home microwave or convection oven.

The dough-like mixture may exit the extruder through a die having various shapes, such as animal shapes, circles, squares, triangles, star-shapes, and the like. The extrudate may be cut at the die by a rotating knife for example, or by a wire cutting device.

The dough-like mixture may be formed into a continuous rope by the use of a round shaped die orifice. It may also be formed into a ribbon or sheet by the use of a horizontally oriented slit or elongated sheet shaped die orifice. The continuous ropes, ribbons, or sheets may be cut into pieces using known reciprocating cutters.

The dough-like mixtures of the present invention may be extruded without the use of a die plate. The thus obtained extrudate, or even die-extruded extrudates, may be formed into pieces using conventional dough-shaping and forming equipment, such as rotary molders, wire cutting machines, sheeting rolls and reciprocating cutters, and the like.

Unlike conventional cookie production, the extruded dough-like mixtures of the present invention are generally formed into pieces when hot. Excessive cooling of the extrudate may result in crumbling of the pieces upon wire cutting or other cutting or shaping operations. Preferably, the extrudates are formed into pieces at temperatures of from about 100° F. to about 150° F.

Consistency, viscosity and plasticity of the extrudates for proper machining may be adjusted, for example, by water or oil addition or reduction in the extruder, or by heating prior to the die, at the die, or after exiting from the die.

Cookie bits or cookie crumb-like products may be produced by extruding the dough-like mixture under very low pressure drops, e.g. without passing it through an extruder die, or at low die flow rates so that the extrudate spontaneously forms into pieces upon falling, onto a moving belt for example. Pieces or drops may also be produced by passing the dough-like mixture through a horizontal or vertical extruder die with a multitude of holes of a size of about $\frac{1}{8}''$ to about $\frac{1}{2}''$. The extrudate strands may then be cut at the die by a rotating knife into cylindrically shaped preheated dough bits.

The pieces may then be leavened by post extrusion heating to form cookie-like pieces or bits. The bits may be screened or sized to obtain cookie bits or "cookie chips" having a substantially uniform size distribution.

The cookie bits or cookie chips may be incorporated into other products, such as "granola type" bars. They may be used to produce a "cookie chip chocolate" product: (a) by incorporating the cookie chips or bits into molten chocolate in a mold and then solidifying the chocolate, (b) by pouring molten chocolate over the bits in a mold, or (c) by enrobing individual or a plurality of bits with melted chocolate. The cookie chips may, for example, have a maximum dimension of about $\frac{1}{8}''$ to about $\frac{1}{2}''$. The amount of the cookie bits incorporated into the product may, for example, be from about 10% by weight to about 90% by weight, based upon the weight of the cookie chip chocolate product. The leavened cookielike pieces or bits also may be: (a) ground into crumbs for use in pie crusts, for example or, (b) compacted, in a mold for example, to produce unitary cookie products.

The unleavened dough bits may also be compacted in a mold to obtain a unitary product which may be subsequently leavened. Bits having different sizes and/or compositions may be combined in the mold to produce the unitary products.

Filled products may be produced in accordance with the present invention by coextruding the dough-like mixture with filler materials. The coextrudate may be formed by the use of a concentric die or a tube inserted within the die orifice. Filled products may also be produced by transporting the dough-like mixture extrudate to a conventional enrobing or encrusting machine, such as produced by the Rheon Manufacturing Company for post extrusion filling with a filler material.

Examples of fillers which may be used include chocolate, vanilla, butterscotch, fruit, peanut butter, and cheese-flavored fillings. The filling material may also be a separately produced dough-like mixture for the production of multi-flavored, multi-colored, or multi-textured cookie products.

The extrudate pieces are leavened and further browned using: (a) electromagnetic radiation or electronic heating, such as dielectric radio frequency heating, microwave heating, or infrared heating, (b) heated air, such as from a convection oven or fluidized bed heater, (c) frying, or (d) combinations thereof. For example, a combination may comprise microwave heating or dielectric radio frequency heating for internal heating and infrared heating for more intense surface heating. The microwave, infrared, and radio frequency energy may be applied at pressures of from about 0.2 bars to about 6 bars.

When applying dielectric heating, the low conductive food product to be heated is placed between electrodes, which act as capacitor plates, and forms the dielectric of one or more capacitors. A high frequency voltage is applied across the electrodes. Alternating of the electrostatic field or of the polarity of the voltage results in heating of the product.

The frequencies generally used for dielectric heating are about 2 to 90 MHz, e.g. about 13–14 MHz, about 27 MHz, or about 40–41 MHz. The frequencies generally used for microwave heating are, for example, about 2,450 MHz for domestic ovens and about 896 to 915 MHz for industrial ovens.

The heating of the pieces in the dielectric or radio frequency oven, microwave oven, or combinations thereof, or in a fryer is generally performed so that proper leavening and browning is achieved, for example, within about 90 seconds, preferably within about 60 seconds, depending upon the thickness and diameter of the pieces. Infrared heating, conductive heating, and hot air heating are generally conducted within about two to three minutes. Infrared heating should generally be performed subsequent to another form of post extrusion heating. It tends to heat the surface and form a skin which prevents leavening gases from escaping. Generally, the heating of the pieces or cookie preforms in the post extrusion oven should be sufficient to result in an internal temperature of at least about 160° F., preferably at least about 190° F. in the cookie.

Dielectric radio frequency ovens, microwave ovens, infrared ovens, hot air ovens, and the like which may be used are conventional, industrial scale continuous throughput ovens. Continuous, conventional fryers may also be used in embodiments of the present invention. Conductive heating devices which may be used include waffle-type conductive heaters.

The post extrusion heated leavened products of the present invention have a water activity of less than about 0.7, preferably less than about 0.6. The water content of the products is generally less than about 6% by weight, suitably from about 2% by weight to about 4% by weight, based upon the weight of the post extrusion baked product, exclusive of inclusions. The products exhibit a cookie crumb-like structure appearance, and texture and structural integrity. Starch gelatinization (measured by differential scanning calorimetry) for the cookie products of the present invention is generally less than about 5%.

In the process of the present invention, a cooker extruder having two screws is preferably utilized. Preferably the screws of the extruder will be corotating, i.e., rotate in the same direction. Corotating twin screw elements, generally provide thorough mixing and conveying of the components, with the elements of one screw continuously wiping the other screw. This is particularly advantageous when the composition being mixed has a relatively high viscosity. Suitable extruders which may be used in the present invention include: (1) WENGER model series TX by Wenger of Sabetha, Kansas, (2) model series MPF by Baker Perkins, (3) model series BC by Creusot Loire of Paris, France, and preferably (4) model series ZSK or Continua by Werner and Pfleiderer. Single screw extruders including those with a horizontally oscillating screw during rotation (i.e. a Buss kneader by Buss of Pratteln, Switzerland) may also be used in accordance with the present invention.

A preferred screw configuration which may be used in the present invention with a Werner and Pfleiderer model ZSK-57 twin screw cooker extruder is disclosed in copending U.S. Pat. application Ser. No. 362,375 entitled "Extruder Apparatus For Producing An At Least Partially Baked Product Having A Cookie-Like Crumb Structure," filed in the name of Bernhard Van Lengerich on June 7, 1989. The disclosure of the latter application is incorporated herein by reference in its entirety.

The extruder throughput or mass flow rates utilized in the present invention with a Werner and Pfleiderer ZSK 57 twin screw cooker extruder are generally from about 150 lbs/hr to about 850 lbs/hr of extrudate. Higher rates may be achieved with other models. For example, a throughput rate of 6000 lbs/hr may be achieved using a Werner and Pfleiderer model Continua 120 cooker extruder.

The present invention is further illustrated in the following examples where all parts, ratios, and percentages are by weight and all temperatures are in ° F., unless otherwise stated:

EXAMPLE 1

A liposome-encapsulated Maillard browning reactant may be prepared by encapsulating the basic amino acid, L-lysine, according to the following procedure. L-lysine (mono hydrochloride salt), in the amount of 1 gram, was dissolved in 33 ml of water containing 0.04 grams of glycerol. The pH of the solution was 9.3. Sodium hydroxide, 1N, was added to the solution, such that the pH was adjusted to 1 pH unit above the pKa of the alpha amino group. Final pH was 9.5. The aqueous solution prepared above was brought to 65° C., a temperature just above the phase transition temperature of the phospholipid to be used in the formation of the vesicle membrane bilayer The phospholipid was a phosphatidylcholine sold under the name of Phospholipon 100-H. Three grams of the phospholipid were added to the aqueous solution at 65° C. The suspension was allowed to stir for eighteen hours at 65° C. At the end of eighteen hours, the liposomes so formed were allowed to cool to room temperature. Liposome vesicles thus formed were examined by light microscopy and found to range in size from 4 to 24 microns in diameter. They were also found to show "form" birefringence under polarized light, consistent with the presence of a condensed, ordered crystalline state. Liposome vesicles were separated from the bulk aqueous phase by centrifugation to form a liposome gel. The amount of lysine encapsulated was 28 mg/g of wet liposome. This corresponds to an encapsulation efficiency of 59% and a total lysine content of 3% by weight based on the total weight of the liposome gel. The viscous gel can be used as is or redispersed in water to a pumpable consistency.

EXAMPLE 2

The ingredients, their feed placement, and their relative amounts which may be used to prepare a cookie having a crumb-like structure and texture using extrusion heating and microwave baking in accordance with the present invention are:

| INGREDIENT AND PLACEMENT | WEIGHT % |
|---|---|
| Component 1: first dry feed port | |
| Wheat flour, bleached (about 12% by weight water) | 49.88 |
| Non-fat dry milk (about 52% by weight lactose) | 1.50 |
| Salt | 0.75 |
| Component 2: second dry feed port | |
| White sugar (sucrose), granulated | 14.72 |
| Brown sugar (about 89% sucrose, 3% invert, 4% non-sugar solids, 3% water) | 6.86 |
| Sodium Bicarbonate | 0.25 |
| Liposome-Encapsulated Maillard Browning Reactant of Example 1 | 3.50 |
| Component 3: first liquid feed port | |
| Soybean spray oil | 22.56 |
| Total | 100.00 |

The co-rotating twin screw cooker extruder which may be used to prepare the cookie products of the present invention was a Werner and Pfleiderer ZSK-57 equipped with a screw configuration as shown and described in copending U.S. Pat. application Ser. No. 362,375 entitled "Extruder Apparatus For Producing An At Least Partially Baked Product Having A Cookie-Like Crumb Structure," filed in the name of Bernhard Van Lengerich on June 7, 1989. The extruder has twelve barrels, each provided with external, jacketed heating and cooling means. First and second dry feed ports are set up at barrels 1 and 8, respectively. These two dry feed ports are open to the atmosphere. The first liquid feed port may be set up between barrels 1 and 2. The second liquid feed port is the same as the second dry feed port at barrel 8. The second liquid feed inlet pipe is inserted into the open port at barrel 8 so that optional second dry feed ingredients and the second liquid feed ingredients could be separately fed into the same port.

The first barrel, which contains the first dry feed port, may be set on constant cool to obtain an actual barrel temperature of less than about 100° F. The remaining eleven barrels may be divided into 7 separately measured barrel temperature zones. Barrels 2 and 3 correspond to temperature zone 1, barrels 4 and 5 correspond to zones 3, 4, and 5, respectively, barrels 9 and 10 correspond to temperature zone 6, and barrels 11 and 12 correspond to temperature zone 7.

Barrels 2 through 6 may be set to heat to 350° F., barrel seven to 200° F., barrel eight may be set on constant cool, barrels 9 and 10 may be set at 100° F. and barrels 11 and 12 may be set at 110° F.

Paddles and screw elements may be arranged on the screw shafts from upstream to downstream to provide: (a) rapid conveying of the added dry ingredients in barrel 1, (b) conveying of the dry ingredients and added oil and gradually increasing the degree of fill in barrel 2, (c) chopping or mixing action for admixing the oil and dry ingredients, conveying to gradually increase the degree of fill, and mixing in barrel 3, (d) repeated conveying and an increased degree of mixing in barrel 4, (e) increased mixing, conveying and increased mixing to gradually increase the degree of fill in each of barrels 5 and 6, (f) increased mixing, conveying, and increased mixing to provide the highest degree of mixing in barrel 7, (g) fast conveying of the dry and liquid ingredients fed to the port in barrel 8, (h) conveying with a gradual increase in degree of fill in barrel 9, (i) conveying and mixing with a gradual increase of degree of fill in barrel 10, (j) conveying and mixing in barrel 11, and (k) conveying with a buildup in pressure sufficient to extrude the dough-like mixture through the extruder die. Gradually increasing the degree of fill tends to reduce points of high pressure which may cause oil separation.

The screws may be rotated at about 125 rpm at about 2% of maximum torque. The ingredients may be fed in their relative amounts to provide a throughput or mass flow rate of the dough-like mixture extrudate of about 405 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semi-solid soybean spray oil to obtain a liquid oil which may be continuously fed to the first liquid feed port.

At steady state, the barrel set temperatures and the actual barrel temperatures may be:

| Barrel # | Barrel Set Temperature, °F. | Actual Barrel Temperature, °F. |
|---|---|---|
| 1 | cool | — |
| 2 | 350 | 206 |
| 3 | 350 | — |
| 4 | 350 | 245 |
| 5 | 350 | 324 |
| 6 | 350 | — |
| 7 | 200 | 201 |
| 8 | cool | 100 |
| 9 | 100 | — |
| 10 | 100 | 100 |
| 11 | 120 | — |
| 12 | 120 | 115 |

The pressure in the extruder may be less than about 10 bars. The average or median residence time of the ingredients heated prior to addition of components 2 and 4 at the second feed ports is about 40–50 seconds. The average or median residence time of the ingredients in the extruder from the second feed ports is about 10 to 20 seconds. The substantially homogeneous dough-like mixture formed in the extruder may be extruded through a horizontally oriented slit die (about 5mm high by about 50 mm wide) to obtain a continuous, substantially unleavened ribbon. The extrudate temperature upon exiting the extruder may be about 140° F. The ribbon was cut into cylindrical pieces by hand, using a cookie cutter. The diameter of the pieces may be about ½".

Six pieces may be subjected to microwave heating in a microwave oven for about 50 seconds to produce distinctly leavened, surface-browned cookies having a crumb-like structure.

We claim:
1. A method for the production of a cookie product having a liposome-encapsulated component uniformly dispersed therein comprising:

(a) forming a heat treated mass in a cooker extruder by heating ingredients comprising at least one flour and shortening or fat to a temperature of at least about 150° F. to promote browning and flavor development, (b) admixing water and at least one liposome-encapsulated component with the heat-treated mass with sufficient mixing to uniformly disperse the liposome-encapsulated component within the mass without rupturing a substantial portion of the liposomes in said cooker extruder to form a dough-like mixture, wherein the temperature of the heat treated mass is reduced to below about 140° F. for admixing with the liposome component and wherein the amount of shortening or fat is at least about 12% by weight, based upon the weight of the dough-like mixture, (c) extruding the mixture under sufficiently low pressure and temperature such that substantial rupture of the liposomes is inhibited, (d) forming the mixture into pieces having at least one liposome-encapsulated composition uniformly dispersed therein, and (e) leavening the pieces by subjecting it to post extrusion heating to obtain a crumb-like structure.

2. The method of claim 1 wherein the pieces are leavened by heating at a sufficiently low temperature and for a duration sufficiently short such that a substantial portion of the liposomes remain intact.

3. The method of claim 1 wherein said pieces are leavened by heating under conditions such that a substantial portion of the liposomes rupture and release the encapsulated composition.

4. The method of claim 1 wherein the flour and fat are heated at a temperature of at least 200° F. for about 20 to 120 seconds to form the heat treated mass.

5. The method of claim 1 wherein said cookie dough-like mixture includes a chemical leavening agent selected from the group consisting of sodium bicarbonate, ammonium bicarbonate, calcium carbonate, ammonium phosphate, tartaric acid, and mixtures thereof.

6. The method of claim 1 wherein said cookie mixture comprises about 30% to about 70% by weight flour, about 10% to 40% by weight sugar, about 12% to 40% by weight fat or shortening, and less than about 20% by weight water.

7. A method as claimed in claim 1 wherein the amount of water admixed with said heat treated mass is from about 0.5% by weight to about 10% by weight, based upon the weight of the dough-like mixture.

8. The method as claimed in claim 1 wherein said heat treated mass is cooled to a temperature of about 100° F. to about 150° F. prior to addition of said water.

9. A method as claimed in claim 1 wherein the temperature of said heat treated mass is reduced by at least about 35° F. prior to said addition of the water to the heat treated mass.

10. The method of claim 1 wherein said dough-like mixture is extruded at a temperature of less than about 140° F. and a pressure of less than about 5 bars whereby rupture of the liposomes and substantial fat separation are inhibited.

11. The method of claim 1 wherein said liposomeencapsulated component is a vitamin, flavor, fragrance, preservative, antioxidant, coloring agent, enzyme, edible acidulant, reducing sugar, or non-nutritive sweetener.

12. The method of claim 1 wherein said dough-like mixture includes an amount of the liposome-encapsulated composition such that the dough-like mixture contains about 0.01% to 1.0% by weight of the encapsulant, based on the total weight of the dough-like mixture.

13. The method of claim 1 wherein at least one reducing sugar is admixed with the flour and fat in an amount effective to promote Maillard browning during said heating to form said heat treated mass.

14. The method of claim 1 wherein said flour and fat include at least one protein source in an amount effective to promote Maillard browning during heating to form said heat treated mass.

15. A cookie product having a liposome-encapsulated component uniformly dispersed therein prepared by the method of claim 1.

16. The method of claim 1 wherein said liposomeencapsulated component is heat-activated to release the component from the liposomes.

17. The method of claim 1 wherein said liposomeencapsulated component is contained in an aqueous liposome dispersion and said dispersion is admixed with the heat treated mass at a temperature and pressure sufficiently low to substantially inhibit fat separation from the dough-like mixture.

18. The method of claim 1 wherein at least one sugar is admixed with the flour and fat and subjected to said heating to form said heat treated mass.

19. The method of claim 1 wherein at least one sugar is admixed with the heat treated mass.

20. A method as claimed in claim 1 wherein the shortening or fat content of said dough-like mixture is from about 20% by weight to about 30% by weight, based upon the weight of the dough-like mixture.

21. A method for the production of a cookie product having a liposome-encapsulated component uniformly dispersed therein comprising:

(a) forming a dough-like mixture in a cooker extruder from ingredients comprising flour, water, at least one sugar, and shortening or fat, the amount of shortening or fat being at least about 12% by weight, based upon the weight of the dough-like mixture, wherein at least the flour and shortening or fat are heated to a temperature of at least about 150° F. in said cooker extruder to form a heat-treated mass, and water and at least one liposome composition are admixed with the heat treated mass, said liposome composition including at least one liposome-encapsulated component and being admixed with the heat treated mass at a heat treated mass temperature of about 100° F. to about 140° F., (b) extruding the dough-like mixture from said cooker extruder at sufficiently low temperature and pressure to inhibit substantial liposome rupture, (c) forming the dough-like mixture into pieces, and (d) leavening the pieces in a post extrusion heater to obtain a crumb-like structure.

22. The method of claim 21 comprising admixing at least one source of water with the heat treated mass in an amount sufficient to form a dough-like consistency and at sufficiently low temperature and pressure to inhibit substantial fat separation.

23. The method of claim 21 wherein said dough-like mixture contains less than about 20% water and has a water activity of less than about 0.7.

24. The method of claim 21 comprising admixing at least one sugar with the heat treated mass.

25. The method of claim 21 comprising admixing at least sugar with the flour and fat and heating to form the heat treated mass.

26. A method as claimed in claim 21 wherein the shortening or fat content of said dough-like mixture is from about 20% by weight to about 30% by weight, based upon the weight of the dough-like mixture.

27. A method as claimed in claim 21 wherein said pieces are leavened by heating under conditions such that a substantial portion of the liposomes rupture and release the encapsulated composition.

* * * * *

UNITED STATES PATENT AND TRADEMARK OFFICE
CERTIFICATE OF CORRECTION

PATENT NO. : 4,999,208

DATED : March 12, 1991

INVENTOR(S) : Bernhard H. van Lengerich, et al.

It is certified that error appears in the above-identified patent and that said Letters Patent is hereby corrected as shown below:

On the title page, under item [19], "Lengerich" should be --van Lengerich--;

in item [75], the spelling of the first named inventor should read as follows:

--Bernhard H. van Lengerich--.

Signed and Sealed this

Eleventh Day of August, 1992

Attest:

DOUGLAS B. COMER

*Attesting Officer*  *Acting Commissioner of Patents and Trademarks*